(12) United States Patent
Kammerloher

(10) Patent No.: US 9,963,664 B2
(45) Date of Patent: May 8, 2018

(54) SUPPLYING HEAT TO A PROCESSING DEVICE IN A PLANT FOR PRODUCING BEER

(71) Applicant: KRONES AG, Neutraubling (DE)

(72) Inventor: Helmut Kammerloher, Freising (DE)

(73) Assignee: KRONES AG, Neutraubling (DE)

( * ) Notice: Subject to any disclaimer, the term of this patent is extended or adjusted under 35 U.S.C. 154(b) by 339 days.

(21) Appl. No.: 14/438,085

(22) PCT Filed: Nov. 6, 2013

(86) PCT No.: PCT/EP2013/073139
§ 371 (c)(1),
(2) Date: Apr. 23, 2015

(87) PCT Pub. No.: WO2014/072329
PCT Pub. Date: May 15, 2014

(65) Prior Publication Data
US 2015/0275159 A1    Oct. 1, 2015

(30) Foreign Application Priority Data

Nov. 12, 2012   (DE) .................. 10 2012 220 581

(51) Int. Cl.
*C12C 7/06* (2006.01)
*C12C 7/22* (2006.01)
(Continued)

(52) U.S. Cl.
CPC ............. *C12C 7/067* (2013.01); *C12C 7/06* (2013.01); *C12C 7/22* (2013.01); *C12C 7/26* (2013.01); *F28D 20/0039* (2013.01); *F28D 21/0001* (2013.01); *F28D 2020/006* (2013.01); *Y02E 60/142* (2013.01)

(58) Field of Classification Search
CPC combination set(s) only.
See application file for complete search history.

(56) References Cited

U.S. PATENT DOCUMENTS

2013/0000863 A1   1/2013   Kammerloher

FOREIGN PATENT DOCUMENTS

| CN | 101146906 A | 3/2008 |
| DE | 102006037368 A1 | 8/2007 |

(Continued)

OTHER PUBLICATIONS

Office Action, Chinese patent application No. 201380059104.3, dated Feb. 14, 2016.

(Continued)

*Primary Examiner* — Donald R Spamer
(74) *Attorney, Agent, or Firm* — Marshall, Gerstein & Borun LLP

(57) ABSTRACT

A method for a multi-step supply of heat to at least one processing device in a brewhouse includes storing in an energy storage tank a heat transfer medium, which is heated by a heat recovery device before it is stored; in a first phase, supplying heat to the at least one processing device mainly by supplying the heat transfer medium from the energy storage tank to the at least one processing device; and, subsequently, in a second phase, supplying a heat amount, which increases over time, of heat of non-recuperative origin to the heat transfer medium supplied to the at least one processing device, and thus to the at least one processing device.

19 Claims, 3 Drawing Sheets

(51) Int. Cl.
*F28D 20/00* (2006.01)
*C12C 7/26* (2006.01)
*F28D 21/00* (2006.01)

(56) References Cited

FOREIGN PATENT DOCUMENTS

| | | |
|---|---|---|
| DE | 102009055300 A1 | 6/2011 |
| DE | 102010042765 A1 | 4/2012 |
| EP | 2 630 230 B1 | 8/2013 |
| WO | WO-00/27992 A1 | 5/2000 |
| WO | WO-2011/076410 A1 | 6/2011 |
| WO | WO-2012/045395 A1 | 4/2012 |

OTHER PUBLICATIONS

International Search Report for PCT/EP2013/073139, dated Apr. 29, 2014.
German Search Report for Application No. 102012220581.0, dated Aug. 7, 2013.

SUPPLYING HEAT TO A PROCESSING DEVICE IN A PLANT FOR PRODUCING BEER

CROSS-REFERENCE TO RELATED APPLICATION

The present application is the US national phase of International Patent Application No. PCT/EP2013/073139, filed Nov. 6, 2013, which application claims priority to German Application No. 102012220581.0, filed Nov. 12, 2012. The priority application, DE 102012220581.0, is hereby incorporated by reference.

FIELD OF THE INVENTION

The present invention relates to the supply of heat in the form of a heat transfer medium (in particular warm or hot water) to processing devices in a plant for producing beer, especially in the brewhouse, and in particular to the heating and the keeping hot of mash and/or wort.

PRIOR ART

In the brewhouse the processes of mashing and wort boiling and keeping the wort hot require very large amounts of energy. Therefore, it is necessary to control the energy balance of these processes in the most accurate possible manner and to use, as far as possible, recuperative energy originating from heat recovery units, such as a wort cooler, a kettle vapor condenser or a condensate cooler.

In the prior art (WO 2012 045 395 A1) it is known to supply a heat transfer medium (usually in the form of water), coming from an energy storage tank and heated in a heat exchanger with the aid of high-pressure hot water or steam, to a mashing device. In the energy storage tank, recuperatively recovered energy is stored intermediately in the form of the heat of the stored water as a heat transfer medium and provided for the mashing process. After having transferred the heat to the mashing device, the heat transfer medium is fed back to the energy storage tank with a temperature of 75° C., in any event of less than 80° C. In the case of a preceding additional heating of the heat transfer medium in a heat exchanger and/or very high heating rates, the temperature at which the heat transfer medium is fed back into the energy storage tank may also increase to temperatures above 80° C. and reach temperatures up to 90° C., an additional effect being a decrease in the amount of recuperative energy in the system.

Taking into account the prior art described, it is the object of the present invention to provide an energetically more advantageous supply of heat to a processing device, especially in the brewhouse, such as a mashing unit or a unit for boiling wort or keeping the wort hot.

DESCRIPTION OF THE INVENTION

The above-mentioned object is achieved by a method for a multi-step supply of heat to at least one processing device in a plant for producing beer, in particular in a brewhouse, comprising the steps of:

storing in an energy storage tank a heat transfer medium, which is heated by a heat recovery device (recuperative heat source) before it is stored;

in a first phase, supplying heat to the at least one processing device mainly by supplying the heat transfer medium from the energy storage tank to the at least one processing device; and, subsequently, in a second phase, supplying a heat amount, which increases over time, of heat of non-recuperative origin to the heat transfer medium supplied to the at least one processing device, and thus to the at least one processing device.

Energy (heat) which has been recovered e.g. within a brewing process is thus used for heating the heat transfer medium stored in the energy storage tank. The heat transfer medium may especially be warm water. The term warm water comprises here also hot water. In addition, also heat transfer oil may be used as a heat transfer medium. The heat recovery device may e.g. be a kettle vapor condenser, in which vapors are condensed that form in a wort boiling unit or in a unit for keeping the wort hot, a condensate cooler and/or a wort cooler, which cools wort that has undergone hot break separation.

The heat of non-recuperative origin does not come from a heat recovery device of the plant for producing beer (in particular not from a wort cooler or a kettle vapor condenser). The term "non-recuperative" is here used in a sense meaning that the heat of non-recuperative origin is produced by burning or gasifying a combustible or through pyrolysis or catalysis or electrolysis of a combustible, or through solarthermics or geothermics. Hence, it represents a form of energy produced e.g. from primary energy and constituting a "higher-grade energy" in comparison with recuperatively produced heat.

The processing device is a device in which a process is executed within a brewing process with supply of heat. The processing device may be a unit for boiling wort or for keeping it hot, e.g. a wort copper or a mashing unit, e.g. a mashing vessel, such as a mash tun or a mash pan.

According to the present invention, the supply of heat to the at least one processing device is effected, in the first phase, mainly by supplying the heat transfer medium from the energy storage tank. In said first phase, the supply of heat to the at least one processing device can be effected exclusively by supplying heat transfer medium from the energy storage tank. It is, however, not impossible that, in said first phase, heat may be supplied to the processing device also from other sources, but the total amount of heat supplied to the processing device in said first phase through means other than the heat transfer medium from the energy storage tank is smaller than the amount of heat supplied to the processing device through the heat transfer medium from the energy storage tank.

In the second phase, heat is supplied to the processing device from some other, non-recuperative heat source according to the present invention, the supply of heat to the processing device through the heat transfer medium from the energy storage tank being continued at least for a certain period of time during the second phase. Within the second phase, the amount of heat supplied to the processing device from the non-recuperative heat source increases in the course of time. The increase need not take place continuously, nor need it be constant, but, if desired, such an increase may be adjusted (cf. also the detailed description, in particular the description of FIGS. 2 and 3 following hereinbelow).

Normally, the highest possible amount of the heat stored in the heat transfer medium and originating from the heat recovery device is supplied to the processing device. In comparison with the prior art, more recuperative heat can thus be coupled back into the system. In particular, the heating rate provided at the processing device and the flow of heat into a product to be heated in the processing device can thus be kept approximately constant. A heating rate that is kept approximately constant is here a heating rate exhibiting a maximum variation of +/−0.5 K/min, in particular 0.3 K/min. In the first phase, this is primarily accomplished with the aid of the heat transfer medium from the energy storage tank. After a certain period of time, the heating medium supply temperature is, however, no longer sufficient for a constantly high driving force for keeping the heating rate constant. In the second phase following the first phase, heat from a non-recuperative, normally fossil-fired heat source is therefore added to the recuperative heat transfer medium so as to increase the supply temperature and so as to still keep the heating rate constant.

According to a further development, the at least one processing device has supplied thereto primarily non-recuperatively produced heat in a subsequent third phase, i.e. the amount of heat of non-recuperative origin supplied to the processing device is larger than the amount of heat supplied to the processing device through the heat transfer medium from the energy storage tank. This may result in a situation where the processing device no longer has supplied thereto heat through the heat transfer medium from the energy storage tank in the third phase and/or already at the end of the second phase. In particular, the heating rate can be kept constant in the first and/or second and/or third phase by closed-loop controlling or controlling the supply of heat from the non-recuperative heat source.

The heat originating from the non-recuperative heat source can be supplied with the aid of a heat exchanger to the heat transfer medium from the energy storage tank. The heat exchanger may be provided in the form of a counterflow heat exchanger, a parallel flow heat exchanger or a cross-type heat exchanger.

The heat flows that can be achieved by means of a counterflow heat exchanger are higher than those that can be achieved by other heat exchanger principles, e.g. a cross-type heat exchanger or a parallel flow heat exchanger. Hence, the warmer (heat-transferring) fluid transfers in a counterflow heat exchanger a higher percentage of its amount of heat to the colder (heat-absorbing) fluid than e.g. in a parallel flow heat exchanger. The counterflow heat exchanger has thus the property that the discharge temperature of the product to be heated, i.e. the temperature of the product in the area of the level surface, may be higher than the discharge temperature of the heating medium in the above-described heating medium discharge means.

The loss of energy in a counterflow heat exchanger is therefore much lower than in the case of other heat exchanger principles. Hence, the temperature of the heating medium can be reduced, and the product can thus be heated in a particularly careful manner, whereby the quality of the product can be influenced positively.

According to a further development, the following may be realized: the heating medium is, at least sectionwise, conducted in the heating such that, contrary to a basic flow within the product created on the heating surface, it flows especially from the top to the bottom. The basic flow within the product is created especially by an agitator. Due to the provision of an agitator, e.g. the following movement of the product is obtained: due to the ascending force caused by the agitator and due to the thermal lift, the basic flow of the product follows a flow path from the bottom to the top on the heating surface or, in the case of a wall heater, on the inner surface of the container wall. Most of the particles migrate here helically on the heating surface from a lower area of the liquid to the upper area of the liquid. According to an advantageous embodiment, the heating medium supply means is configured as a continuous ring line, or as a ring line subdivided into individual sections, and has a plurality of, or one continuous opening through which the heating medium flows into the heating. Also the at least one discharge means may be configured correspondingly as a continuous ring line and/or as a ring line that is subdivided into individual sections. Due to the fact that the supply means extends annularly around the heating or heating surface in an upper area of the liquid and the discharge means is located below the supply means, as described above, the heating medium will flow uniformly around the circumference of the heating from the top to the bottom. The heating medium is thus conducted in a counterflow to the basic flow of the product, and very high heat flows are accomplished also with comparatively low temperature differences between the heating medium and the product to be heated.

The heat exchanger may be a tube bundle heat exchanger or a plate heat exchanger. The heating medium used for heating the heat transfer medium coming from the energy storage tank may e.g. be superheated steam or high-pressure hot water to which heat has been transferred via a non-recuperative heat source. In the heat exchanger, part of the incorporated heat is transferred to the heat transfer medium, which supplies this heat to the processing device. The non-recuperative heating medium normally has a temperature that is higher than the highest temperature occurring in the energy storage tank.

In the above-described examples, the heat supplied to the processing device can be used for heating a product in the processing device to 74° C., in particular to or more than 78° C., in particular to more than 85° C. Especially raw mash or decoction mash can be heated in a mashing unit used as a processing device to such comparatively high temperatures and can be boiled or kept hot at such temperatures.

In the above-described examples, the heat supplied to the processing device may be supplied via a contact surface with irregularities in an area contacting the product, in particular via a pillow plate. The contact surface exhibiting irregularities has a higher heat transfer coefficient and thus also a higher thermal transmittance (k-value) than even surfaces. Such a contact surface, which exhibits irregularities that may have the shape of e.g. waves, bubbles and/or bulges and in which the heat transfer medium flows, preferably through a regular or irregular distribution of irregularities (e.g. the welded seams of the pillow plate), in the pillow plate so as to increase the turbulences, and which thus serves to efficiently transfer heat into the product, may especially also serve to maintain a constant flow of heat into a product to be heated in the processing device. A contact surface having this kind of structural design can be used advantageously in a mashing unit, e.g. in a mashing vessel, such as a mash tun or a mash pan. In particular, such a mashing vessel may also exhibit such contact surfaces with irregularities as heating means exclusively on the wall, without the necessity of providing any additional heating in the bottom. In any case, fouling will be reduced significantly due to the low boundary layer temperatures and a comparatively high turbulence on the product side.

In the first and in the second phase, a part of the heat transfer medium may, after having transferred heat to the processing device, e.g. by flowing through a pillow plate, be heated directly through the heat of non-recuperative origin and resupplied to the processing device, without said part being fed back into the energy storage tank. In particular, this part can absorb the heat of non-recuperative origin in the above-mentioned heat exchanger. It follows that this part is here conducted in a circuit extending only via the heat exchanger and the processing device, without including the energy storage tank. Alternatively, this part may be mixed with the heat transfer medium coming from the energy storage tank without further heating and may then be supplied to the processing device. A uniform volume flow through the processing device can be adjusted precisely by making use of suitable valves (cf. also the description following hereinbelow).

In the third phase, the heat transfer medium, at least most of it, may, after having transferred heat to the processing device, be heated directly through the heat of non-recuperative origin, and supplied to the processing device, without being fed back into the energy storage tank. This is especially advantageous in cases where the heat transfer medium fed back from the processing device after the transfer of heat has approximately the same temperature, or a higher temperature as the highest heat transfer medium temperature occurring in the energy storage tank.

In the course of the method, which is used for a multi-step supply of heat to at least one processing device in a brewhouse and which has been described in the above examples, the heat transfer medium, after having transferred heat to the processing device, is resupplied to the energy storage tank at different temperatures. For example, a comparatively hot heat transfer medium (having e.g. a temperature of approx. 95° C. to 98° C.) is removed from the upper area of the energy storage tank and supplied to the processing device for transferring heat energy there. The heat transfer medium which has now a lower temperature (e.g. approx. 75° C. to 85° C.) is then stored again in the energy storage tank in the lower area thereof. Large mixing zones in the energy storage tank should be avoided so that the natural stratification will not be destroyed. The heat transfer medium, which, after the transfer of heat to the processing device, is fed back into the energy storage tank, may therefore be stored in a temperature-dependent (density-dependent) manner in the energy storage tank on different levels thereof, without causing any major mixing, whereby the total energy balance of the method will be optimized still further. The introduction in layers may be executed with the aid of a stratified charging pipe.

As has already been mentioned, the energy storage tank has supplied thereto a heat transfer medium, e.g. warm or hot water, that has been heated with the aid of a heat recovery device, e.g. a kettle vapor condenser and/or a wort cooler. According to a further development, the heat recovery device has supplied thereto a comparatively cold heat transfer medium from the energy storage tank and the energy storage tank has supplied thereto a comparatively hot heat transfer medium from the heat recovery device. The temperature in the supply line from the energy storage tank to the heat recovery device can be closed-loop controlled or controlled, e.g. by mixing a heat transfer medium of the energy storage tank which exhibits different temperatures (which comes from different areas of the energy storage tank).

In the method according to the present invention, at least a part of the heat transfer medium is, after the transfer of heat to the processing device, fed back into the energy storage tank at least during the first phase and during at least part of the second phase. In the period of time elapsing until the third phase begins, this fed-back part of the heat transfer medium exhibits increasingly high temperatures, so that the energy storage tank would effectively be charged with energy (heat); this means, in other words, that the whole content of the energy storage tank is more and more heated.

Hence, it may become necessary to withdraw heat from the heat transfer medium of the energy storage tank so as to be able to maintain the heat exchanger (energy exchanger) with the heat recovery device. The heat transfer medium from the energy storage tank may therefore be cooled with the aid of a (second) heat exchanger before it is supplied to the heat recovery device. The coolant used in this (second) heat exchanger may be cold brewing water. This cold brewing water is heated in the heat exchanger and can be made available as warm water in the brewhouse, by way of example. This (second) heat exchanger may be located in a pump-over line, which is connected to the energy storage tank on a specific level and which thus covers a certain energy storage volume. The heat transfer medium cooled in the (second) heat exchanger can, after having passed through the heat exchanger, be fed back fully or partly into the energy storage tank. The (second) heat exchanger may also be configured such that it is integrated in the energy storage tank. In both cases, a very uniform, charge-independent, continuous heat transfer to the coolant flowing through the (second) heat exchanger can be accomplished and the (second) heat exchanger can thus be configured such that it has comparatively small dimensions. Charge means here exemplarily the process step of mashing or wort-cooling of a brew.

The heat transfer medium coming from the energy storage tank and cooled in the (second) heat exchanger can then be mixed with comparatively cold heat transfer medium (having a temperature below that of the heat transfer medium cooled in the (second) heat exchanger) from the energy storage tank and/or warm heat transfer medium (having a temperature above that of the heat transfer medium cooled in the (second) heat exchanger) from the energy storage tank, and can then be supplied to the heat recovery device. In addition, the thus mixed heat transfer medium can be cooled still further in an additional (third) heat exchanger, if this is desired. Likewise, only one heat exchanger may be used for cooling the mixed heat transfer medium, said mixed heat transfer medium originating from the heat transfer medium of the energy storage tank with a comparatively high temperature (from the upper area of the energy storage tank) and from a heat transfer medium of the energy storage tank with a comparatively low temperature (from the lower area of the energy storage tank).

It follows that the use of the additional, second and/or third heat exchanger will reduce energy (heat) of the heat transfer medium of the energy storage tank in any case. In the heat recovery device, the heat transfer medium coming from the energy storage tank can be used for cooling a product. It may e.g. be used for cooling the wort in a wort cooler. When the product is cooled in the heat recovery device, said heat transfer medium is heated in the heat recovery device and can then be fed back into the energy storage tank.

If the heat recovery device is a wort cooler, the whole amount of heat which is transferred at the wort cooler through cooling of the wort and which is, consequently, absorbed by the heat transfer medium may be conveyed into the energy storage tank. An additional stage at the wort cooler for producing warm water is therefore not necessary in this case. The whole amount of energy (heat) accruing at the wort cooler through cooling of the wort is conveyed into the energy storage tank.

The present invention additionally provides a method for closed-loop controlling or controlling the energy balance of an energy storage tank in a plant for producing beer, in particular in a brewhouse, comprising the steps of supplying a heat transfer medium having a first temperature from a heat recovery device to the energy storage tank;

supplying a heat transfer medium from the energy storage tank to a heat exchanger and cooling the supplied heat transfer medium in the heat exchanger to a second temperature, which is lower than said first temperature; and feeding the cooled heat transfer medium having the second temperature back into the energy storage tank and/or back to the heat recovery device. In particular, the cooled heat transfer medium may, fully or partly, be fed back into the energy storage tank. The heat transfer medium supplied to the heat exchanger from the energy storage tank has a third temperature, which is equal to or lower than the first temperature. The heat recovery device can be given by one of the above-mentioned examples.

The coolant used in this heat exchanger may be cold brewing water or cold process water. This cold process water is heated in the heat exchanger and can be made available as warm water in the brewhouse, by way of example. This heat exchanger may be located in a pump-over line, which is connected to the energy storage tank on a specific level and which thus covers a certain energy storage volume. The heat exchanger may also be configured such that it is integrated in the energy storage tank. In both cases, a very uniform, charge-independent, continuous heat transfer to the coolant flowing through the heat exchanger can be accomplished and the heat exchanger can thus be configured such that it has comparatively small dimensions.

The heat transfer medium coming from the energy storage tank and cooled in the heat exchanger can be mixed with comparatively cold heat transfer medium from the energy storage tank (having a temperature below that of the heat transfer medium cooled in the heat exchanger) and/or warm heat transfer medium from the energy storage tank (having a temperature above that of the heat transfer medium cooled in the heat exchanger), and can then be supplied to the heat recovery device at a, preferably predetermined, temperature. In addition, the thus mixed water can be cooled still further in an additional heat exchanger, if this is desired. Likewise, only one heat exchanger may be used for cooling the mixed heat transfer medium, said mixed heat transfer medium originating from heat transfer medium of the energy storage tank with a comparatively high temperature (from the upper area of the energy storage tank) and from heat transfer medium of the energy storage tank with a comparatively low temperature (from the lower area of the energy storage tank). In addition, the heat transfer medium cooled in the heat exchanger may directly be fed back into the energy storage tank. Each of the above-mentioned heat exchangers can be operated with cold brewing water.

It follows that the use of one of the above-mentioned, or of both heat exchangers will reduce energy (heat) of the heat transfer medium of the energy storage tank in any case. In the heat recovery device, the heat transfer medium coming from the energy storage tank can be used for cooling a product. It may e.g. be used for cooling the wort in a wort cooler. When the product is cooled, this heat transfer medium is heated in the heat recovery device and the heated heat transfer medium can then be fed back into the energy storage tank.

The method for closed-loop controlling or controlling the energy balance of an energy storage tank may additionally comprise the following steps:

in a first phase, supplying heat to at least one processing device mainly by supplying the heat transfer medium from the energy storage tank to the at least one processing device; and, subsequently, in a second phase, supplying a heat amount, which increases over time, of non-recuperative origin to the heat transfer medium supplied to the at least one processing device and thus to the at least one processing device.

The heat transfer medium coming from the processing device can, at least partially, be fed back into the energy storage tank. According to one example, it is here possible that the heat transfer medium, at least part of which is fed back from the processing device into the energy storage tank, is cooled by a heat exchanger prior to entering said energy storage tank so as to reduce/prevent charging of the energy storage tank with energy (heat). The heat exchanger of this example may be connected to the energy storage tank via an additional supply line and may thus also be used for continuously cooling the heat transfer medium of the energy storage tank.

The processing device may be configured according to the above-mentioned examples. In addition, the method for closed-loop controlling or controlling the energy balance of an energy storage tank may comprise all the steps of the above-described method for a multi-step supply of heat to at least one processing device in a brewhouse, said steps being described hereinbefore. Hence, the processing device may in particular comprise a contact surface with irregularities on an area contacting the product to be heated, and especially it may comprise a pillow plate. As has been described hereinbefore, a stratified charging pipe may also here be used in the energy storage tank for introducing the heat transfer medium, which is conducted from the processing device to the energy storage tank, in layers and in a temperature-dependent manner, or the heat transfer medium fed back from the processing device may also be directly stored in the energy storage tank on different levels thereof.

Taking all this into account, the method for a multi-step supply of heat to at least one processing device in a plant for producing beer, in particular in a brewhouse, as well as the method for closed-loop controlling or controlling the energy balance of an energy storage tank according to some of the above-described examples allow to maintain a total heat exchange from the heat recovery device via the energy storage tank to the processing device, said heat exchange allowing an optimum utilization of recuperatively recovered energy (heat).

The above-mentioned object is also achieved by a plant for producing beer, comprising the following elements:

an energy storage tank for storing a heat transfer medium with different temperatures in different areas of the energy storage tank;

at least one processing device; and at least one heat recovery device;

wherein a first area of the energy storage tank is connected to a first heat exchanger via a first supply line, the heat exchanger is connected to the processing device via a second supply line, the processing device is connected to a second area of the energy storage tank via a first return line, the energy storage tank is connected to the heat recovery device via a feed line, and the heat recovery device is connected to the energy storage tank via a return line.

The plant may further comprise a second heat exchanger having connected thereto a heat exchanger supply line, which is connected to a third area of the energy storage tank, in which heat transfer medium having a first temperature is stored. The second heat exchanger comprises a heat exchanger return line, which is connected to a fourth area of the energy storage tank having stored therein heat transfer medium which has a second temperature that is lower than said first temperature, wherein said second heat exchanger is configured for cooling heat transfer medium from the third area of the energy storage tank. The cooled heat transfer medium may, at least partially, be supplied to the fourth area of the energy storage tank. The plant may especially also comprise a mixing unit for mixing heat transfer medium from the fourth area of the energy storage tank and/or the second heat exchanger and heat transfer medium from a fifth area of the energy storage tank, in which heat transfer medium having a third temperature that is higher than the first temperature is stored. Downstream of the mixing unit, a further heat exchanger may be connected to the feed line to the heat recovery device for further cooling.

The plant may especially be configured for executing the above-described method steps. The respective above-mentioned units may be used as processing device and heat recovery device in said plant.

In the following, embodiments of a method according to the present invention are described making reference to the drawing. The embodiments described are to be regarded, in all respects, as being only illustrative but not limiting, and various combinations of the features disclosed are comprised in the present invention.

DETAILED DESCRIPTION OF THE PREFERRED EMBODIMENTS

Figure 1:
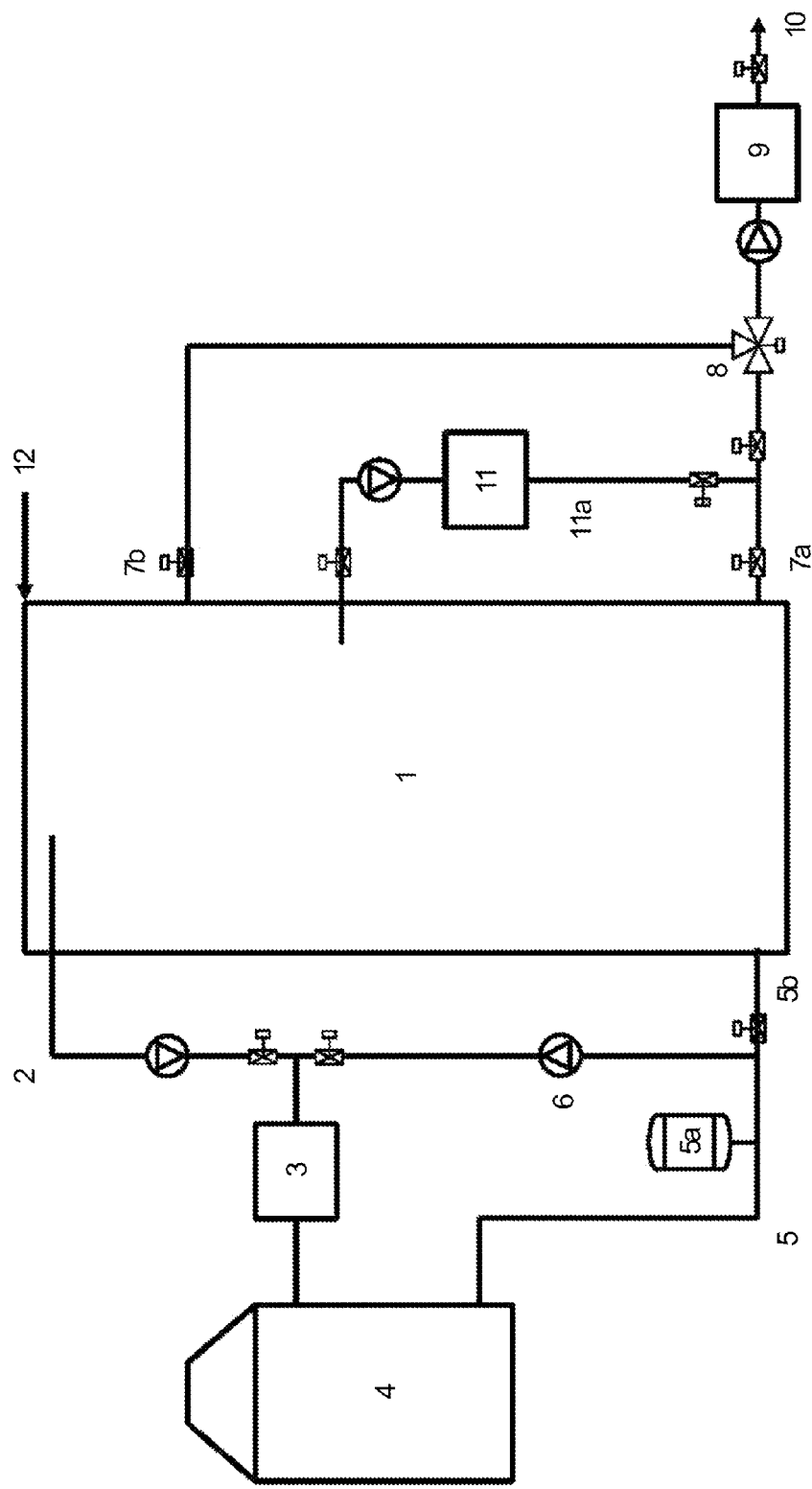
FIG. 1 illustrates a plant in a brewhouse, in which examples of a method according to the present invention are realized.

In the following, examples for a method according to the present invention will be described with reference to FIGS. 1 to 3. An energy storage tank 1 has stored therein a heat transfer medium of different temperatures. The heat transfer medium, which is stored into the energy storage tank 1, is heated, before storing, by a heat recovery device (not shown), e.g. a wort cooler and/or a kettle vapor condenser and/or a condensate cooler. In this way, recuperatively produced heat is provided. For example, a heat transfer medium having a temperature of 95° C. to 98° C. is stored in the upper area of the energy storage tank, whereas a lower area thereof has stored therein a heat transfer medium having a temperature of 75° C. to 85° C. From said upper area, heat transfer medium is supplied via a first supply line 2 to a heat exchanger 3, which, for reheating the heat transfer medium, may be operated with a heating medium which receives its energy (heat) from a non-recuperative (e.g. a fossil) energy source. The non-recuperative energy source is in particular neither a wort cooler nor a kettle vapor condenser nor a condensate cooler, but is usually a unit, which is typically located outside of a brewhouse, for burning or gasifying a combustible or for causing pyrolysis or catalysis/electrolysis of a combustible, or a solar thermal plant or a geothermal plant. The heat transfer medium is supplied from the heat exchanger 3 to a processing device 4. The processing device 4 may e.g. be a mashing unit or a unit for wort boiling or for keeping the wort hot. It goes without saying that also a plurality of processing devices 4 may have supplied thereto heat transfer medium from the energy storage tank 1. Though not shown, the heat exchanger 3 may also be located in other lines, such as the circulation line 6 upstream or downstream of the pump. In addition, a bypass line (not shown) may be provided, via which at least part of the heat transfer medium can be supplied from the energy storage tank 1 past the heat exchanger 3 into the processing device 4.

The heat transfer medium supplies heat to the processing device 4, said heat being transferred to a product to be heated in the processing device 4. This transfer is accomplished e.g. with the aid of one or a plurality of contact surfaces with irregularities in an area contacting said product. For example, the heat transfer medium passes through a pillow plate heating surface integrated in the processing device 4.

After the heat transfer, the heat transfer medium is conducted via the return line 5. Via this return line 5, it can, in principle, be returned to the energy storage tank 1 or conducted via a circulation line with a conveying unit (e.g. a pump) for mixing with heat transfer medium coming from the energy storage tank 1 and supplied to the heat exchanger 3 via the supply line 2.

In order to be able to react to changes in volume caused by the varying temperature of the heat transfer medium, in particular when the heating circuit is operated without feeding the heat transfer medium back into the energy storage tank 1, it may be advantageous to integrate one or a plurality of equalizing tanks 5a in the circuit at various points thereof. For solving this problem it is also imaginable to provide mixing valves, angle valves or overflow valves. Instead of valves, also flaps/control flaps may be used, these valves/flaps being adapted to be used for discharging excessive heating medium. However, this solution of the problem may possibly cause minor losses of energy and heat transfer medium and, consequently, the equalizing tank solution should normally be preferred. Also the energy storage tank 1 itself may serve as an equalizing tank. If this is the case, it should be taken into account in the structural design of the equalizing tank.

Figure 2:
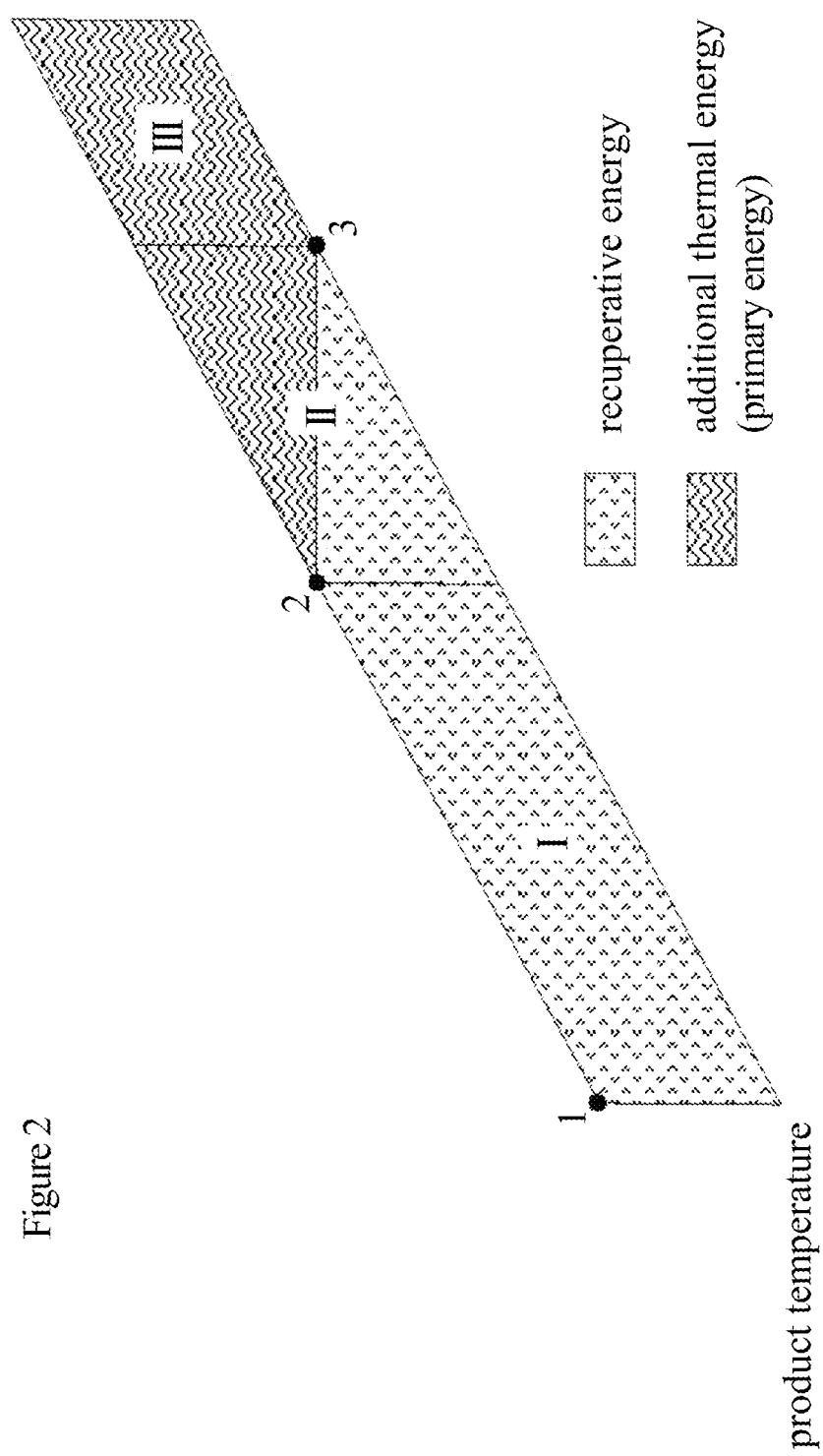
FIG. 2 illustrates a mode of operation of a heating process of a product in a processing device.
Figure 3:
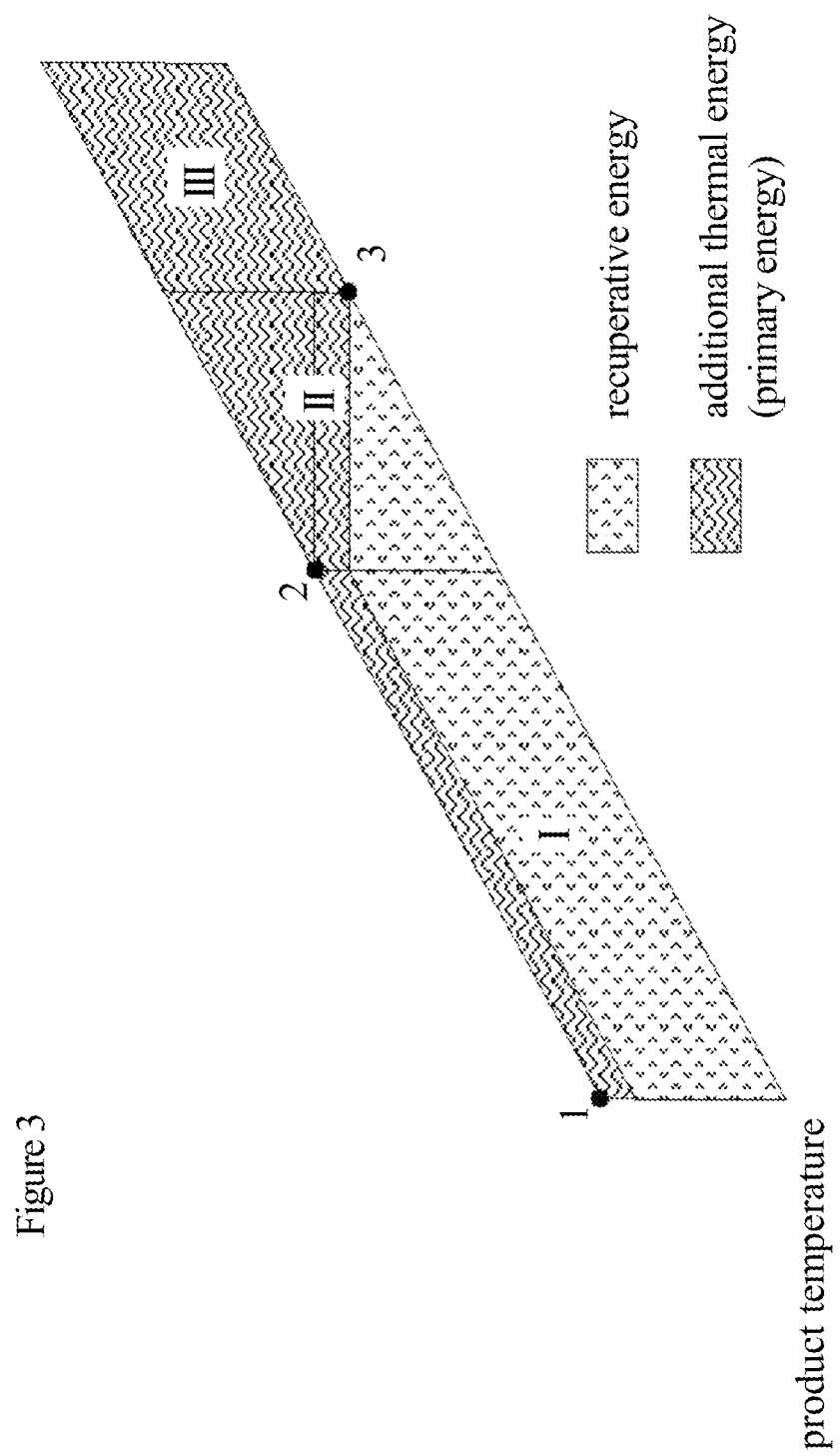
FIG. 3 illustrates a mode of operation of a further heating process of a product in a processing device.

Examples of a method for a multi-step supply of heat to the processing device 4 are illustrated in FIGS. 2 and 3. A uniformly increasing product temperature of the product to be heated in the processing device 4 and, consequently, a constant heating rate of the product is aimed at. The upper ascending line in FIGS. 2 and 3 illustrates a non-varying temperature difference as a driving force (cf. WO 2012/045395). A constant heating rate may e.g. be in the range of 0.05 to 3.5 K/min. In the example shown in FIG. 2, a constant heating rate can be maintained in range I between point 1 and point 2 through recuperative energy (heat) alone, which is obtained from the heat transfer medium of the energy storage tank 1. This means that in phase I the heat exchanger 3 is not operated, and the heat transfer medium flows through the non-operated heat exchanger 3 and transfers its heat at the processing device 4 to the product to be heated in the latter. Up to point 2, the temperature of the heat transfer medium coming from the upper area of the energy storage tank 1 is thus high enough for guaranteeing a constant heating rate of the product in the processing device 4.

In order to maintain the heating rate from point 2 onwards, additional thermal energy must be supplied with the aid of the heat exchanger 3 to the heat transfer medium coming from the energy storage tank 1 (range II). The heat exchanger is here supplied e.g. with non-recuperative energy (e.g. primary thermal energy) in the form of steam or high-pressure hot water (HDHW) or through a thermal energy source whose temperature level lies above the maximum temperature in the upper area of the energy storage tank 1. It should be pointed out that, when pressure is applied to the energy storage tank 1, also higher temperatures, e.g. temperatures up to 130° C., can be obtained in the upper area of the energy storage tank 1.

In range II additional thermal energy is coupled into in the heating medium so as to maintain the desired heating rate. The higher the product temperature (i.e. the temperature of mash or wort, by way of example) the lower the amount of recuperative energy that can be coupled in and the larger the amount of higher-grade thermal energy which has to be coupled into the heating medium by the heat exchanger 3. As long as the return flow temperature of the heat transfer medium from the processing device 4 into the return line 5 is below the upper temperature in the energy storage tank 1, i.e. the supply temperature of the energy storage tank 1 upstream of the heat exchanger 3, part of the thermal energy for the processing device 4 can be provided recuperatively (from the heat transfer medium of the energy storage tank 1). At least from this point (point 3) onwards, the processing device 4 must be supplied e.g. exclusively via the heat exchanger 3 with non-recuperative and consequently higher-grade thermal energy (e.g. fossil energy) (range III). In other words, recuperatively recovered energy from the energy storage tank 1 can in this case no longer be transferred from the energy storage tank to the product to be heated in the processing device 4, i.e. the mash or wort. According to the present invention, recuperative energy can, however, be supplied to the processing device 4 for the longest possible time, the amount of non-recuperative thermal energy coupled in being only as small as possible.

In range I, a part of the heat transfer medium fed back from the processing device 4 may be conducted via the circulation line 6, which includes a pump, for mixing with heat transfer medium coming from the energy storage tank 1 so as to guarantee a constant high volume flow, in particular >0.2 m/s, through a heating unit in the processing device 4, e.g. through a pillow plate heating surface integrated in the processing device 4. A pillow plate may e.g. be integrated in the wall or in the bottom of the processing device 4. Another part of the heat transfer medium fed back from the processing device 4 is refed into the energy storage tank 1. The heat transfer medium fed back from the processing device 4 becomes increasingly hot in the course of ranges I and II. At the latest when it has reached the temperature of the heat transfer medium stored in the upper area of the energy storage tank 1, the heat transfer medium fed back from the processing device 4 may preferably be fully conducted, especially with a constant high volume flow, which is in particular >0.2 m/s, in a circuit via the circulation line 6 including a pump, so as to prevent the energy storage tank 1 from being charged with additional energy.

A constant high volume flow creates corresponding turbulences in the heating unit, said turbulences allowing, in turn, a high heat transfer coefficient and thus a higher thermal transmittance. High thermal transmittance is necessary especially in cases where heating media with a low supply temperature are used and where the driving force (difference between product temperature and heating medium temperature) is consequently low.

Due to the fact that the temperature of the heat transfer medium fed back from the processing device 4 varies with time, this heat transfer medium may, according to one example, be introduced in layers into the energy storage tank 1 with the aid of a stratified charging pipe (cf. WO 2011/076410).

The processing device 4 may be a cylindrical vessel.

According to one embodiment, the following holds true:

The heating medium is, at least sectionwise, conducted in the heating such that, contrary to a basic flow within the product created on the heating surface, it flows especially from the top to the bottom. The basic flow within the product is created especially by an agitator. Due to the provision of an agitator, e.g. the following movement of the product is obtained: due to the ascending force caused by the agitator and due to the thermal lift, the basic flow of the product follows a flow path from the bottom to the top on the heating surface or, in the case of a wall heater, on the inner surface of the container wall. Most of the particles migrate here helically on the heating surface from a lower area of the liquid to the upper area of the liquid. According to an advantageous embodiment, the heating medium supply means is configured as a continuous ring line, or as a ring line subdivided into individual sections, and has a plurality of, or one continuous opening through which the heating medium flows into the heating. Also the at least one discharge means may be configured in a corresponding manner as a continuous ring line and/or as a ring line that is subdivided into individual sections.

Due to the fact that the supply means extends annularly around the heating or heating surface in an upper area of the liquid and the discharge means is located below the supply means, as described above, the heating medium will flow uniformly around the circumference of the heating from the top to the bottom.

The heating medium is thus conducted in a counterflow to the basic flow of the product, and very high heat flows are accomplished even with comparatively low temperature differences between the heating medium and the product to be heated.

The heat flows that can be achieved by means of a counterflow heat exchanger are higher than those that can be achieved by other heat exchanger principles, e.g. a cross-type heat exchanger or a parallel flow heat exchanger. Hence, the warmer (heat-transferring) fluid transfers in a counterflow heat exchanger a higher percentage of its amount of heat to the colder (heat-absorbing) fluid than e.g. in a parallel flow heat exchanger. The counterflow heat exchanger has thus the property that the discharge temperature of the product to be heated, i.e. the temperature of the product in the area of the level surface, may be higher than the discharge temperature of the heating medium in the above-described heating medium discharge means.

The loss of energy in a counterflow heat exchanger is therefore much lower than in the case of other heat exchanger principles. Hence, the temperature of the heating medium can be reduced, and the product can thus be heated in a particularly careful manner, whereby the quality of the product can be influenced positively.

FIG. 3 shows an example for the method according to the present invention, in which the desired heating rate can, from the very beginning, not be accomplished by exclusively utilizing the recuperatively recovered energy (heat) stored in the energy storage tank 1. In contrast to the example shown in FIG. 2, part of the energy required for heating a product in the processing device 4 must, already in range I, be provided in the form of non-recuperative energy (e.g. primary thermal energy). It follows that, other than in the example shown in FIG. 2, the heat exchanger 3 operates, from the very beginning, with the aid of non-recuperative energy, e.g. in the form of superheated steam or high-pressure hot water. From point 3 onwards, the whole energy required for further heating the product in the processing device 4 is, just as in the case of the example shown in FIG. 2, transferred via the heat exchanger 3 to the heat transfer medium coming from the energy storage tank 1 and from said heat transfer medium to the product.

As has already been mentioned, the processing device 4 may be a mashing vessel. In mashing processes known from the prior art, it is common practice to treat the product according to a predetermined temperature profile. It is known that the mash is here heated to specific temperature levels while observing certain breaks. For the sake of simplicity, the various breaks at specific temperatures are not shown in FIGS. 2 and 3. Likewise, it is known that in the case of large mashing vessels or wort-treating tuns, the surface/volume ratio changes, i.e. that the surface available for heating the product, i.e. the mash and/or the wort, becomes smaller. Not only in this case, it may no longer be possible to maintain a desired heating rate exclusively by means of recuperative energy from the very beginning of the process. To this end, it is then of course also possible that non-recuperative thermal energy is, as shown in FIG. 3, continuously coupled into the processing device 4 so as to increase the driving force.

In addition, it is of course imaginable that the percentage of non-recuperative energy in the heat supply to the processing device is constantly slightly increased or reduced, i.e. that the supply of heat does not take place with an unchanging driving force (fixedly), as has been shown in FIGS. 2 and 3. In any case, a very careful heating of mashes and/or decoction mashes and/or wort can be accomplished so that the boundary layer temperature can be adjusted to the lowest possible level, since the product is not heated with superheated steam or the like, but primary energy is only used indirectly via heating of the heat transfer medium coming from the energy storage tank 1 for supplying heat to the processing device 4. Especially when pillow plates are used, a high heat transfer of more than 1,600 W/(m²·K), in particular more than 1,900 W/(m²·K), can be accomplished. When a mashing unit is used as a processing device 4, an economically as well as technologically advantageous short mashing time can be accomplished in this way.

The energy storage tank 1 shown in FIG. 1 is supplied with recuperatively recovered heat energy by a heat recovery device (not shown) via a return line 12. In principle, the return line 12 may open into the supply line 2. The heat recovery device may be a wort cooler, a kettle vapor condenser or a condensate cooler. It goes without saying that also a plurality of heat recovery devices may supply heat energy to the energy storage tank 1.

In the following it will be assumed exemplarily that the heat recovery device is a wort cooler. The heat transfer medium heated during cooling of the wort in the wort cooler is supplied to the energy storage tank 1 via the return line 12. The heat transfer medium used for cooling in the wort cooler is supplied from the energy storage tank 1 via a feed line 10 with a conveying unit.

In the example shown in FIG. 1, the temperature of the heat transfer medium in the feed line 10 to the wort cooler can be adjusted precisely according to requirements. Via a feed line 7a, cold heat transfer medium is supplied from the lower area of the energy storage tank 1, and via an additional feed line 7b, hot heat transfer medium is supplied from the upper area of the energy storage tank 1. The heat transfer medium supplied via the feed line 7a and the heat transfer medium supplied via the feed line 7b are mixed in a mixing unit 8 precisely such that a defined/predetermined temperature is obtained, the temperature sensor required for this purpose being not shown. A pump-over line 11a (with a conveying unit), which is connected to the energy storage tank 1 on a certain level and which thus covers a certain energy storage volume, has provided therein a heat exchanger 11 in which heat transfer medium from an area above the connection of the feed line 7a of the energy storage tank 1 can be cooled, e.g. with the aid of cold brewing water. The heat transfer medium of the energy storage tank 1 cooled in the heat exchanger 11 is supplied to the feed line 7a, where it mixes with the heat transfer medium coming from the lower area of the energy storage tank 1. Even though the heat exchanger 11 is shown outside the energy storage tank 1 in FIG. 1, it may, alternatively, also be installed inside said energy storage tank 1. The cooled heat transfer medium discharged from the heat exchanger 11 may be fed back, fully or partly, into the energy storage tank 1. In particular, the heat exchanger 11 may be integrated in the energy storage tank 1 and continuously cool the heat transfer medium in said energy storage tank 1, without said heat transfer medium being conducted from the heat exchanger 11 to the exterior of the energy storage tank 1. In addition, the heat exchanger 11 may also be disposed e.g. in line section 5b and, moreover, it may optionally be connected to the energy storage tank 1 with another supply line (here not shown).

Furthermore, another heat exchanger 9 may be provided downstream of the mixing unit 8. With the aid of said heat exchanger 9 the water mixed in the mixing unit 8 can be cooled. Thus, a precise temperature of the heat transfer medium can be adjusted by the mixing unit 8 and/or the heat exchanger 9. The amount of energy required for an even energy balance can thus be collected accurately from the wort cooler (or some other heat recovery device). In the heat exchangers 9 and 11, a heat transfer medium having a specific temperature can be produced and then be used in the way intended. The heat exchanger 9 may be provided in addition to the heat exchanger 11, but it may also be provided without said heat exchanger 11.

In principle, it may happen that, due to a comparatively high temperature of the heat transfer medium in the return line 5 of FIG. 1, which is connected to the processing device 4, the energy storage tank 1 is charged with energy (heat) in an undesirable manner. With the aid of the heat exchanger 11, energy (heat) can then be withdrawn from the energy storage tank 1. Thus, it is possible to establish a total, balanced heat exchange from the heat recovery device (e.g. from a wort cooler) via the energy storage tank 1 to the processing device 4 (e.g. a mashing vessel), substantially controlled/closed-loop controlled, on the one hand, through the energy demand of the processing device 4 and, on the other hand, through the mixing of the heat transfer medium from the feed lines 7a and 7b, which are connected to the energy storage tank 1, in the mixing unit 8.

The above description shows clearly that FIG. 1 illustrates, on the one hand, an example of a method according to the present invention for a multi-step supply of heat to at least one processing device in a plant for producing beer, e.g. in a brewhouse, and, on the other hand, an example of a method according to the present invention for closed-loop controlling or controlling the energy balance of an energy storage tank in a plant for producing beer, e.g. in a brewhouse.

The invention claimed is:
1. A method for a multi-step supply of heat to at least one processing device in a plant for producing beer comprising:
storing in an energy storage tank a heat transfer medium, which is heated by a heat recovery device before the heat transfer medium is stored;

in a first phase, supplying heat to the at least one processing device including supplying the heat transfer medium from the energy storage tank to the at least one processing device; and, subsequently, in a second phase, supplying a heat amount, which increases over time, of heat of non-recuperative origin to the heat transfer medium supplied to the at least one processing device, and thus to the at least one processing device.

2. The method according to claim 1, and, subsequently, applying heat of mainly non-recuperative origin is supplied in a third phase, to the at least one processing device.

3. The method according to claim 1, and keeping a heating rate at the processing device substantially constant.

4. The method according to claim 1, and with the aid of a first heat exchanger, supplying the heat of non-recuperative origin to the heat transfer medium, which is fed to the at least one processing device.

5. The method according to claim 1, and by means of the heat supplied to the processing device, heating a product within the at least one processing device via a contact surface with irregularities on an area contacting said product.

6. The method according to claim 1, wherein, due to the heat supplied to the processing device, a product within at least one the processing device is heated to a temperature above 74° C.

7. The method according to claim 1, wherein, in the first and in the second phase, a part of the heat transfer medium is, after having transferred heat to the at least one processing device, heated directly through the heat of non-recuperative origin, and resupplied to the processing device, without said part being fed back into the energy storage tank (1).

8. The method according to claim 1, wherein, in the first and in the second phase, a part of the heat transfer medium is, after having transferred heat to the processing device, resupplied to the at least one processing device, without said part being fed back into the energy storage tank (1).

9. The method according to claim 1, wherein, in a third phase, at least most of the heat transfer medium, is, after having transferred heat to the processing device, heated directly through the heat of non-recuperative origin and supplied to the at least one processing device without being fed back into the energy storage tank (1).

10. The method according to claim 1, wherein, after having transferred heat to the at least one processing device, heat transfer medium is introduced in layers into the energy storage tank (1) on different levels and in a temperature-dependent manner.

11. The method according to claim 1, further comprising the steps of mixing a heat transfer medium of the energy storage tank with a first temperature and a heat transfer medium of the energy storage tank with a second temperature, which is lower than said first temperature, so as to obtain a mixed heat transfer medium having a certain temperature;

supplying the mixed heat transfer medium having said certain temperature to the heat recovery device;

cooling a product in said heat recovery device with the aid of the mixed heat transfer medium supplied, and feeding the heat transfer medium, which has been heated during cooling of the product in the heat recovery device, back to the energy storage tank.

12. The method according to claim 11, wherein the heat transfer medium of the energy storage tank from a first area is cooled in a second heat exchanger before the heat transfer medium is mixed with the heat transfer medium of the energy storage tank from a second area.

13. The method according to claim 11, wherein the mixed heat transfer medium has admixed thereto, before the heat transfer medium is supplied to the heat recovery device, heat transfer medium from a third area of the energy storage tank with a third temperature, which is higher than the first temperature.

14. The method according to claim 11 wherein the mixed heat transfer medium is cooled in a third heat exchanger before the heat transfer medium is supplied to the heat recovery device.

15. The method according to claim 11, wherein the heat transfer medium of the energy storage tank is cooled by a heat exchanger.

16. The method according to claim 1, wherein the heat recovery device is a wort cooler and the entire heat absorbed at the wort cooler through cooling of the wort in the cooled mixed heat transfer medium is conveyed into the energy storage tank.

17. The method according to claim 1, wherein the at least one processing device is a mashing unit.

18. The method of claim 17, wherein the mashing unit is a mashing vessel that is one of a mash tun or a mash pan.

19. The method of claim 1, wherein the processing device is a unit for at least one of boiling wort or for keeping wort hot.

* * * * *